Nov. 23, 1943.   B. S. WRIGHT   2,335,035
AERODYNAMIC BRAKE OPERATING MEANS
Filed Jan. 31, 1941   2 Sheets-Sheet 1

INVENTOR
BURDETTE S. WRIGHT
BY
ATTORNEY

Patented Nov. 23, 1943

2,335,035

UNITED STATES PATENT OFFICE 2,335,035

AERODYNAMIC BRAKE OPERATING MEANS

Burdette S. Wright, Buffalo, N. Y., assignor to Curtiss-Wright Corporation, a corporation of Delaware Application January 31, 1941, Serial No. 376,753

5 Claims. (Cl. 244—110)

This invention relates to aircraft, and is particularly concerned with a combined control system for aerodynamic brakes and for landing gear wheel brakes.

In certain flight maneuvers aerodynamic brakes are useful in controlling the air speed of an aircraft, as, for instance, in long dives and in landing. In diving, speed control is desirable to increase maneuverability of the aircraft, and when the aerodynamic brake controls, hereinafter called the air brake controls, are operable with great ease by the pilot without interfering with the other flight controls, greater flexibility of flight operation is obviously assured. During the diving maneuvers both hands and both feet of the pilot are fully employed in important controlling operations, and if the air brake control comprises a separate instrumentality it is apparent that such control cannot be utilized to its full advantage. An appropriate location for air brake controls is on the rudder pedals which, according to conventional practice, are already provided with foot pedals movable with and with respect to the rudder stirrups, these pedals being connected to the landing wheel brakes which, of course, serve no function during flight. It is thus an object of this invention to provide a combined control system for wheel brakes and air brakes, utilizing pedals on the rudder stirrups for control of these devices.

A further object is to provide an air brake control on the rudder stirrups operable by the pilot's feet while they are normally engaged in operating the rudder.

A further object is to provide a control device for air and wheel brakes in which a first phase of control movement actuates the air brake only, and a second phase of movement operates the landing wheel brakes.

A further object is to provide a unitary instrumentality capable of operating both air and wheel brakes.

Still another object is to provide, in connection with the usual two rudder control stirrups and the two wheel brake operating pedals associated therewith, auxiliary means by which air brakes on an aircraft may be operated.

Further objects of the invention will become apparent in reading the annexed specification and claims in connection with the drawings, in which:

The system as disclosed herein contemplates hydraulic operation for either or both wheel and air brake motor systems, but it is wholly within the scope of the invention to use operating media other than hydraulics.

Figure 1:
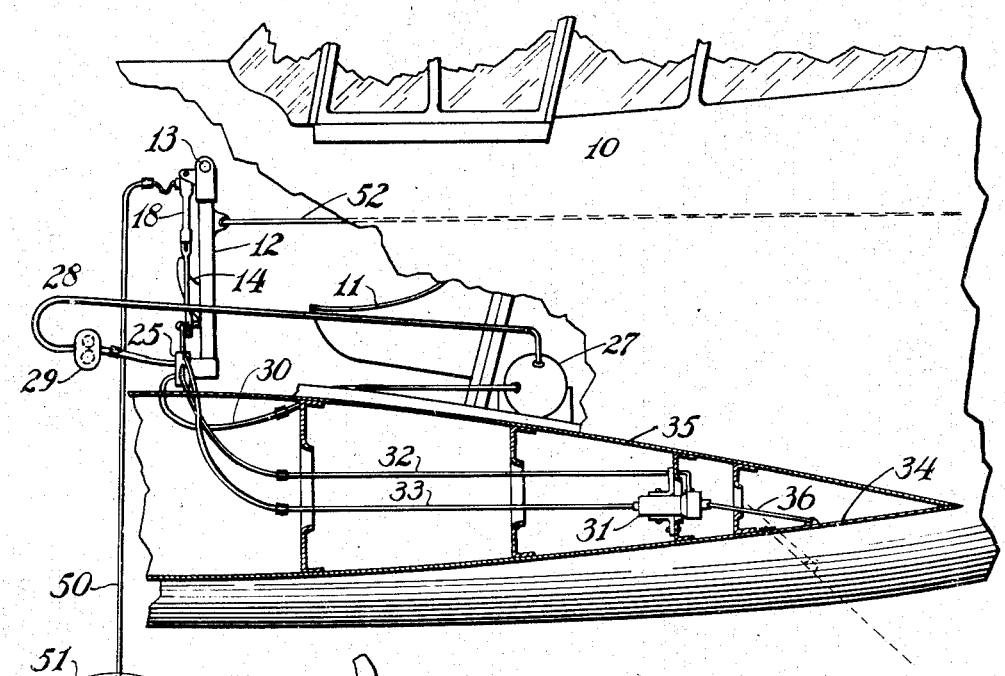
Fig. 1 is a partial side elevation of an airplane fuselage, cut away to show the control system.
Figure 2:
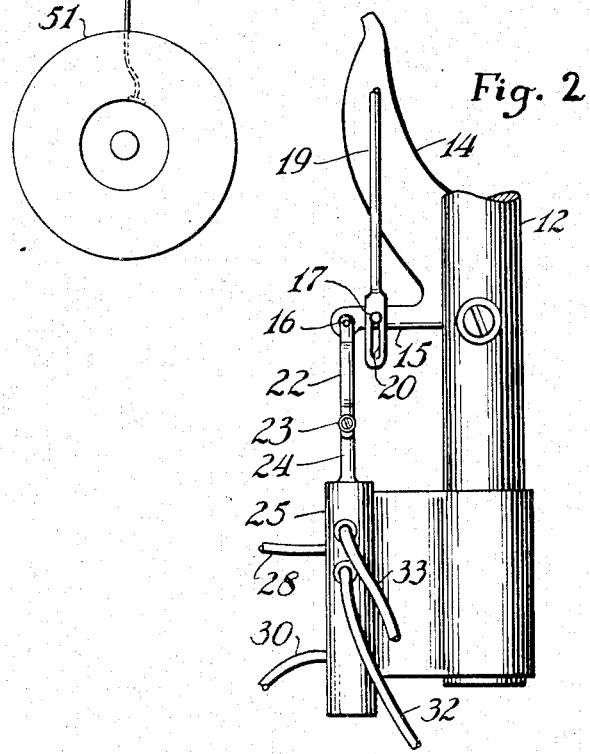
Fig. 2 is an enlarged side elevation of the lower part of a rudder stirrup and pedal assembly.

Referring first to Figs. 1 and 2, a portion of a fuselage 10 is indicated, containing a pilot's seat 11 and rudder control stirrups, only one of the identical stirrup assemblies being indicated at 12. This stirrup is pivoted to the aircraft structure at 13 and carries, for movement with and with respect thereto, a foot pedal 14 upon which the pilot's foot normally rests. The pedal 14 carries an arm 15 with two pivot connections 16 and 17, the latter being linked to a wheel brake operating motor 18 by a rod 19 whose lower end is slotted as at 20. When pressure is imposed on the pedal 14, the latter will move counter-clockwise, moving the arm 15 downwardly and allowing the pivot pin 17 to ride freely in the slot 20 until the pin engages the lower end of the slot. Continued movement of the pedal 14 will then operate the wheel brake motor 18 in the conventional manner. The initial movement of the pedal 14 acts through the pivot 16 on a link 22 pivoted at 23 to the valve piston rod 24 of an air brake valve 25 which is served with fluid from a reservoir 27 through a pipe 28 and a serially arranged constant pressure engine pump 29. Fluid from the air brake valve returns to the reservoir 27 through an exit line 30. Fluid from the valve assembly 25 is passed to and from an air brake operating motor 31 through pipes 32 and 33, the motor 31 comprising a piston-cylinder assembly linked to an air brake flap 34 hinged near the trailing edge of a wing 35, through a rod 36. The pipes 28, 29, 32 and 33 are flexible adjacent the stirrup 12 to allow of stirrup movement for rudder control. It will be appreciated that wings 35 are disposed on each side of the fuselage 10; that each such wing will have a flap 34 and that the left hand pedal 14 will serve to operate the left hand flap 34, while the right hand pedal 14 will serve to operate the right hand flap 34.

The flap motor 31 in detail comprises a cylinder 40 to the forward closed end of which the pipe 33 is connected and to the rearward end of which the pipe 32 is connected. The piston 41 within the cylinder extends through the rearward end of the cylinder, through an appropriate packing 42, for connection to the rod 36. The valve assembly 25 comprises a cylinder 38 through which a valve piston 39 is axially movable under the influence of the piston rod 24.

Figure 3:
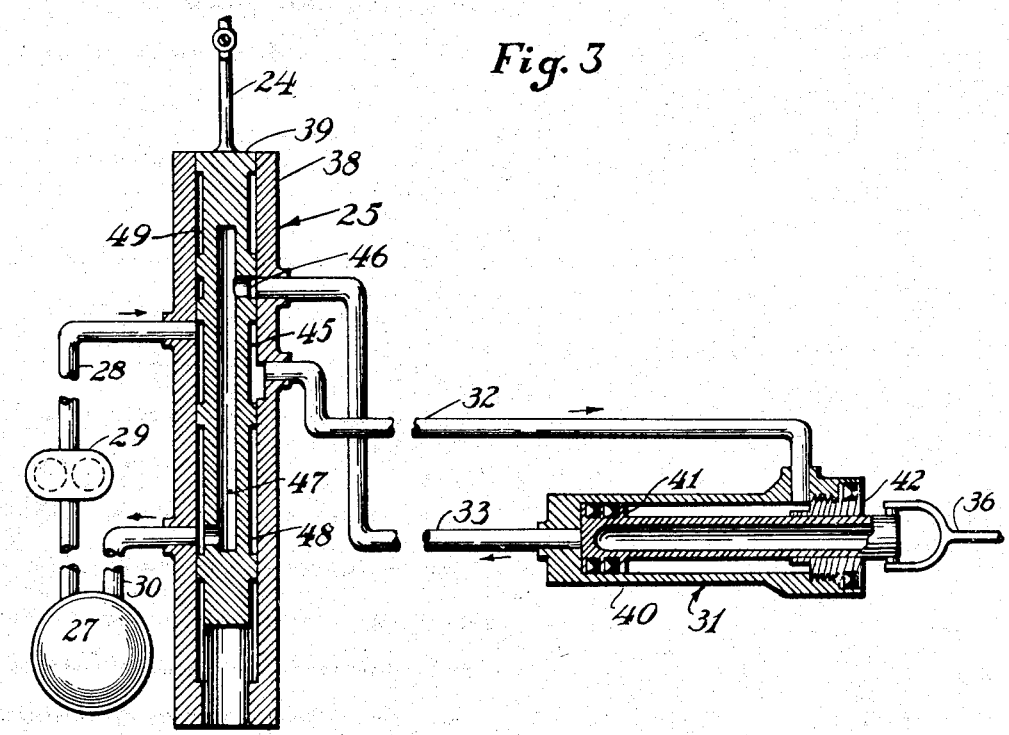
Figs. 3 and 4 are sectioned elevations of the air brake control valve and operating motor.
Figure 4:
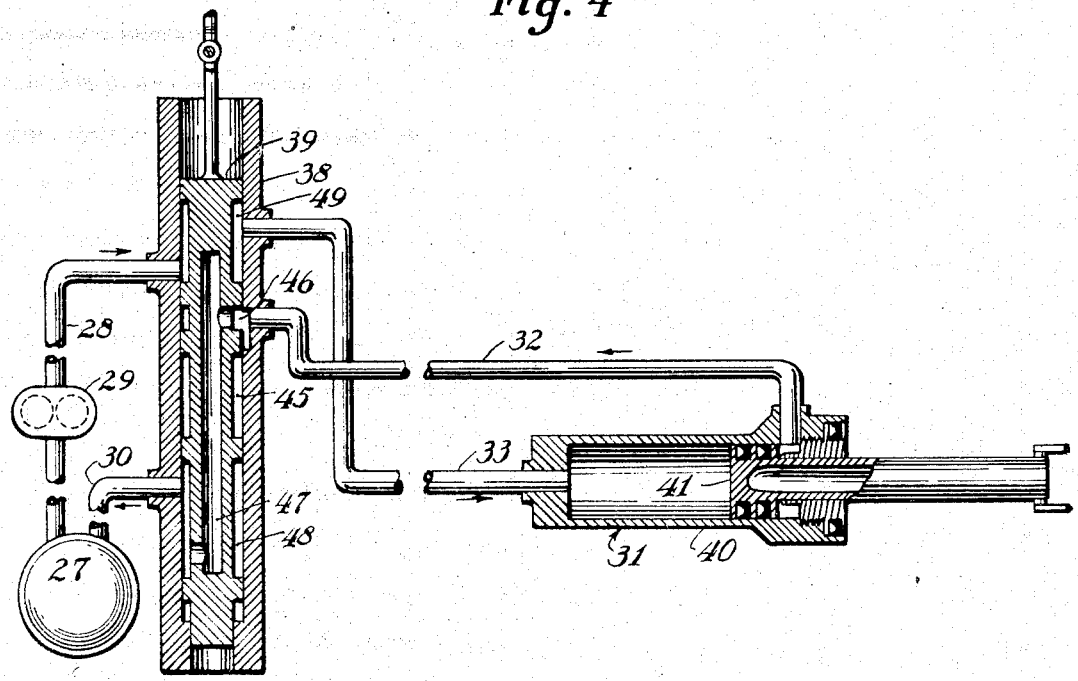

The valve piston 39 has circumferential lands and grooves along with a central bore connected with certain of the grooves, appropriately arranged to effect the piping interconnections. When the valve piston 39 is in the full up position, the pressure line 28 connects with the line 32 through the piston groove 45, placing pump pressure on the right side of the brake motor piston 41 to hold the landing flap in or move it to the retracted position. Also, the pipe 33 is connected to the exit pipe 30 through a groove 46 communicating with a valve piston bore 47 and with a groove 48 registered with the pipe 30. In the first stage of depression of the valve piston 39, the pressure line 28 will register with the groove 46, short-circuiting pump flow from the air brake motor 31. At this time the pipes 32 and 33 will both be isolated. In the next stage of depression of the valve piston 39 an upper groove 49 will register with the pressure line 28 and with the pipe 33, thereby directing pressure fluid to extend the air brake flaps. Fluid on the right hand side of the motor piston 41 scavenges through the line 32 and through the grooves 46 to the exit line 30. Subsequent downward movement of the valve piston 39 will cause no change in this adjustment—this subsequent movement of the valve piston 39 may be considerable, and takes place when the stirrup pedals 14 are further depressed to cause operation of the wheel brake motors 18. Return movement of the pedal 14 will have no effect on the air brake motor until the position of Fig. 3 is reached whereat the air brake flap 34 is returned to its inactive position by the operation of the motor 31.

The valving arrangement for the air brake provides essentially for full extension or full retraction of the air brake flaps by small movement of the pedals 14 during flight. Ordinarily, both pedals would be operated together to cause the air brake flaps on opposite sides of the aircraft body to lower and raise simultaneously. In the landing maneuver, both air brake flaps would usually be lowered by slight movement of both pedals 14 and upon ground contact the pedals 14 may be jointly or independently operated for wheel brake control while both air brake flaps are held in the lowered position. As actuation of the wheel brakes becomes unnecessary, both pedals 14 may be fully relaxed, whereupon the wheel brakes are disengaged and likewise the air brake flaps are both retracted.

Since wheel brake controls from the wheel brake motors or valves 18 are old in the art, details of this system are not shown. In general, however, the line 50 represents the power connection to the brake of the landing wheel 51. Suitable return springs not shown are incorporated in the system for the pedals 14. Suitable means indicated at 52 are secured to the rudder stirrups as operating connections to the airplane rudder, not shown.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft having a wheel-type landing gear, a landing wheel brake, means operable to apply said brake, an aerodynamic braking surface, means operable to apply said aerodynamic brake, a control member having a first phase of movement and a second phase of movement constituting a continuation of said first phase, connecting means between said control member and said aerodynamic brake applying means operative to effect complete application of said brake during the first phase of movement of said control member and to maintain the complete application of said aerodynamic brake during the second phase of movement of said control member, and connecting means between said control member and said landing wheel brake applying means operative to effect application of said landing wheel brake only during the second phase of movement of said control member.

2. In an aircraft having a wheel-type landing gear, a landing wheel brake, means operable to apply said brake, an aerodynamic braking surface, means operable to apply said aerodynamic brake, and a control member operaitvely connected to both of said brake applying means and having a first phase of movement and a second phase of movement, said control member being operable to effect operation of said aerodynamic brake applying means during its first phase of movement to completely apply said aerodynamic brake and being operable to effect operation of said wheel brake applying means only during its second phase of movement and without altering the prior complete application of said aerodynamic brake.

3. In an aircraft having a wheel-type landing gear, a landing wheel brake, means operable to apply said brake, an aerodynmic braking surface, means operable to apply said aerodynamic brake, a control member having a first phase of movement and a second phase of movement constituting a continuation of said first phase, connecting means between said control member and said aerodynamic brake applying means operative to effect complete application of said aerodynamic brake during the first phase of movement of said control member and to maintain the complete application of said aerodynamic brake during the second phase of movement of said control member, and connecting means including lost motion means between said control member and said wheel brake applying means operative to effect application of said wheel brake only during the second phase of movement of said control member.

4. In an aircraft having a control surface, a wheel-type landing gear and a control element adapted to effect operation of said control surface, the combination of, a landing wheel brake, motor means for applying said brake, an aerodynamic braking surface, a hydraulic motor operatively connected to said braking surface, valve means operable to control said hydraulic motor, a control member having a first phase of movement and a second phase of movement constituting a continuation of said first phase, connecting means between said control member and valve means operative to completely open said valve means to fully apply said aerodynamic brake during the first phase of movement of said control member and to maintain said full application of said aerodynamic brake during the second phase of movement of said control member, and connecting means including lost motion means between said control member and said motor means operative to energize said motor means and apply said wheel brake only during the second phase of movement of said control member, and means for mounting said valve means and control member on said control element.

5. In an aircraft having an airfoil control surface, a wheel-type landing gear and a control element adapted to effect operation of said control surface, the combination of, a landing wheel brake, means operable to apply said brake, an aerodynamic braking surface, means operable to apply said aerodynamic brake, a control member operatively connected to both of said brake applying means and having a first phase of movement and a second phase of movement constituting a continuation of said first phase, said control member being adapted to effect operation of said aerodynamic brake applying means during its first phase of movement to completely apply said aerodynamic brake and being adapted to effect operation of said wheel brake applying means only during its second phase of movement and without disturbing the prior complete application of said aerodynamic brake, and means for mounting control member on said control element.

BURDETTE S. WRIGHT.